United States Patent [19]

Matsuo et al.

[11] Patent Number: 5,196,163
[45] Date of Patent: Mar. 23, 1993

[54] HIGHLY CORROSION-RESISTANT ZIRCONIUM ALLOY FOR USE AS NUCLEAR REACTOR FUEL CLADDING MATERIAL

[75] Inventors: Yutaka Matsuo, Tokyo; Yoshitaka Suda, Oyama; Nobuo Suda, Omiya; Takeshi Isobe, Omiya; Kazuyosi Adachi, Omiya, all of Japan

[73] Assignee: Mitsubishi Materials Corporation, Tokyo, Japan

[21] Appl. No.: 536,075

[22] Filed: Jun. 11, 1990

Related U.S. Application Data

[63] Continuation of Ser. No. 300,230, Jan. 23, 1989, abandoned, which is a continuation-in-part of Ser. No. 72,411, Jul. 13, 1987, abandoned.

[30] Foreign Application Priority Data

Jul. 29, 1986 [JP] Japan .................. 61-178442
Jan. 22, 1988 [JP] Japan .................. 63-12323

[51] Int. Cl.$^5$ ............................................. C22C 16/00
[52] U.S. Cl. .................................... 420/422; 148/421; 376/900
[58] Field of Search ........... 420/422; 148/421, 12.7 B, 148/11.5 F; 376/457, 900

[56] References Cited

U.S. PATENT DOCUMENTS

3,121,034  2/1964  Anderko et al. ................ 420/422

FOREIGN PATENT DOCUMENTS

1207096  12/1965  Fed. Rep. of Germany .
1241998   6/1967  Fed. Rep. of Germany .
1408152   3/1963  France .

*Primary Examiner*—Deborah Yee
*Attorney, Agent, or Firm*—Frishauf, Holtz, Goodman & Woodward

[57] ABSTRACT

A corrosion resistant zirconium alloy for use as a nuclear reactor cladding material. This alloy consists essentially of, on a weight % basis 0.02–1.7 % Sn, 0.19–0.6% Fe, 0.07–0.4% Cr, 0.01–0.2% Ta, and optionally 0.05 up to less than 0.5% Nb, the balance being Zr and incidental impurities, provided that the content of the nitrogen in the form of incidental impurities is no more than 60 ppm.

7 Claims, No Drawings

HIGHLY CORROSION-RESISTANT ZIRCONIUM ALLOY FOR USE AS NUCLEAR REACTOR FUEL CLADDING MATERIAL

This application is a Continuation, of application Ser. No. 07/300,230, filed Jan. 23, 1989 (abandoned); which is a Continuation-In-Part of Ser. No. 07/072,411 filed Jul. 13, 1987 (abandoned).

FIELD OF THE INVENTION

The present invention relates to a zirconium alloy suitable for use as the material of a nuclear reactor fuel cladding that is to be exposed to hot pressurized water or steam.

TECHNICAL BACKGROUND

Pressurized-water reactors (PWR) in nuclear power plants employ fuel claddings made of zirconium alloys, of which Zircaloy 4 having the following composition is typical:

1.2–1.7% Sn;
0.18–0.24% Fe;
0.07–0.13% Cr; and
the balance being zirconium and incidental impurities (the percentage being based on weight as hereinafter).

With a view to improving the economy of the operation of nuclear power plants, efforts are being made to maximize the efficiency of fuel burnup and this has led to the need for fuel claddings to stay in the reactor for a longer period. But this need cannot be met by the conventional fuel claddings made of zirconium alloys typically Zircaloy 4, because they do not have sufficient corrosion resistance to withstand prolonged exposure to the atmosphere in the reactor.

Under these circumstances, the present inventors conducted studies in order to develop a zirconium alloy that exhibits superior corrosion resistance when used as a nuclear reactor fuel cladding material, the studies being particularly addressed to modification of Zircaloy 4. As a result, the present inventors found that an alloy additionally containing Ta, and optionally Nb, too, in the composition specified above had such improved corrosion resistance that it was suitable for use as a nuclear reactor fuel cladding material over a prolonged period.

SUMMARY OF THE INVENTION

The present invention has been accomplished on the basis of this finding and provides a zirconium alloy for use as a nuclear reactor fuel cladding material that contains:

0.2–1.7% Sn, preferably 0.2–1.15% Sn,
0.19–0.6% Fe, preferably 0.19–0.24% Fe,
0.07–0.4% Cr, preferably 0.07–0.13% Cr,
0.01–0.2% Ta, and optionally
0.05 up to less than 0.5% Nb,
the balance being zirconium and incidental impurities, provided that the content of the nitrogen in the form of incidental impurities is no more than 60 ppm.

DETAILED DESCRIPTION OF THE INVENTION

The tin (Sn), iron (Fe) and chromium (Cr) components present in combination in the zirconium alloy of the present invention serve to provide improved corrosion resistance. If the amount of any one of these three components is less than the lower limit specified above, the desired level of corrosion resistance is not ensured. On the other hand, if the amount of Sn exceeds 1.15%, the corrosion resistance of the resulting alloy tends to decrease. This tendency is encouraged if the Sn amount exceeds 1.7%. The Sn content in the alloy of the present invention is therefore limited to the range of 0.2–1.7%, preferably 0.2–1.15%. If the amounts of Fe and Cr exceed 0.24% and 0.13%, respectively, the corrosion resistance of the alloy also tends to slightly decrease. This tendency is encouraged if the amounts of Fe and Cr exceed 0.6% and 0.4%, respectively. The Fe content is therefore limited to the ranges of 0.19–0.6%, preferably 0.19–0.24%, and the Cr content is limited to the range of 0.7–0.4%, preferably 0.07–0.13%.

Tantalum also serves to provide improved corrosion resistance. If its content is less than 0.01%, the intended effect for improving corrosion resistance is not attained. If, on the other hand, the content of Ta exceeds 0.2%, absorption of neutrons is so much increased as to inhibit nuclear reactions. Therefore, the content of Ta in the alloy of the present invention is limited to be within the range of 0.01–0.2%.

The alloy of the present invention may optionally contain niobium which, if present in combination with tantalum, contributes to further improvement in corrosion resistance. If the content of Nb is less than 0.05%, the desired effect for improving corrosion resistance will not be attained. If, on the other hand, the content of Nb is 0.5% or greater, strong neutron absorption also occurs as in the case of the presence of excessive tantalum. In addition, the presence of excessive niobium leads to the formation of an increased amount of precipitate in the alloy that reduces its workability. Therefore, the content of niobium in the alloy of the present invention is limited to be within the range of 0.05 up to less than 0.5%.

If the content of nitrogen in the form of incidental impurities exceeds 60 ppm., high corrosion resistance cannot be ensured even if the contents of Sn, Fe, Cr, Ta and Nb are within the ranges specified above. The nitrogen content in the form of incidental impurities is therefore limited to be no more than 60 ppm.

Example

The zirconium alloy of the present invention is hereunder described more specifically by means of an example.

A zirconium sponge having a purity of no less than 99.8%, and Sn, Fe, Cr, Ta and Nb powders each having a purity of 99.9% were provided as starting materials. These starting materials were blended in predetermined proportions and the resulting mixes were pressed into compacts. The compacts were melted in an arc furnace and formed into buttons, which were then hot-forged at a temperature of 600° C. for a draft of 50% and heated at 1,080° C. Thereafter, the buttons were water-quenched and pickled in a salt bath, followed by cold rolling for a draft of 50%, holding at 630° C. for 2 hours to effect recrystallization and annealing, another cold rolling for a draft of 50%, and holding at 450° C. for 2 hours to effect stress-relieving annealing. Finally, the buttons were pickled and polished. As a result, test specimens for Zr alloy Nos. 1 to 12 of the present invention and comparative Zr alloy Nos. 1 to 7 were prepared; these specimens had the compositions shown in Table 1 and measured 20 mm wide, 40 mm long and 0.5 mm thick.

Comparative Zr alloy Nos. 1 to 7 were such that one of their components (marked with an asterisk in Table 1) was outside the compositional range specified by the present invention.

All test specimens were subjected to an out-of-pile corrosion test in a common static autoclave in steam at 400° C. and at 105 kg/cm$^2$. After 200 days, the corrosion weight gain that had occurred in each test specimen was measured. The results are shown in Table 1.

TABLE 1

| Sample | Composition (wt %) | | | | | | | Corrosion weight gain (mg/dm$^2$) |
|---|---|---|---|---|---|---|---|---|
| | Sn | Fe | Cr | Ta | Nb | N (ppm) | Zr + impurities | |
| Zr alloy of this invention | | | | | | | | |
| 1 | 0.21 | 0.20 | 0.10 | 0.048 | | 37 | bal. | 99 |
| 2 | 0.52 | 0.21 | 0.092 | 0.012 | | 32 | " | 128 |
| 3 | 0.51 | 0.20 | 0.097 | 0.049 | | 40 | " | 104 |
| 4 | 0.50 | 0.20 | 0.11 | 0.071 | | 32 | " | 101 |
| 5 | 0.51 | 0.21 | 0.10 | 0.18 | | 33 | " | 113 |
| 6 | 0.70 | 0.20 | 0.092 | 0.58 | | 30 | " | 108 |
| 7 | 0.75 | 0.193 | 0.013 | 0.082 | | 39 | " | 105 |
| 8 | 1.19 | 0.21 | 0.10 | 0.013 | | 38 | " | 136 |
| 9 | 1.13 | 0.21 | 0.098 | 0.053 | | 34 | " | 121 |
| 10 | 1.41 | 0.20 | 0.12 | 0.052 | | 44 | " | 136 |
| 11 | 1.63 | 0.20 | 0.11 | 0.095 | | 51 | " | 134 |
| 12 | 1.66 | 0.20 | 0.095 | 0.082 | | 41 | " | 131 |
| 13 | 1.02 | 0.191 | 0.10 | 0.047 | | 32 | " | 114 |
| 14 | 1.06 | 0.36 | 0.11 | 0.047 | | 33 | " | 125 |
| 15 | 0.99 | 0.56 | 0.11 | 0.050 | | 37 | " | 139 |
| 16 | 1.03 | 0.21 | 0.075 | 0.049 | | 33 | " | 112 |
| 17 | 1.04 | 0.20 | 0.22 | 0.052 | | 35 | " | 114 |
| 18 | 1.00 | 0.22 | 0.36 | 0.055 | | 36 | " | 148 |
| 19 | 1.02 | 0.33 | 0.21 | 0.051 | | 52 | " | 124 |
| 20 | 1.03 | 0.41 | 0.32 | 0.048 | | 46 | " | 136 |
| 21 | 1.05 | 0.55 | 0.37 | 0.048 | | 33 | " | 164 |
| 22 | 1.01 | 0.21 | 0.10 | 0.053 | 0.054 | 31 | " | 122 |
| 23 | 1.00 | 0.22 | 0.12 | 0.051 | 0.11 | 40 | " | 115 |
| 24 | 1.02 | 0.21 | 0.10 | 0.046 | 0.23 | 36 | " | 113 |
| 25 | 0.97 | 0.20 | 0.10 | 0.054 | 0.48 | 35 | " | 127 |
| 26 | 0.24 | 0.21 | 0.10 | 0.031 | 0.052 | 32 | " | 102 |
| 27 | 0.81 | 0.20 | 0.092 | 0.029 | 0.32 | 38 | " | 110 |
| 28 | 0.48 | 0.192 | 0.10 | 0.091 | 0.16 | 30 | " | 107 |
| 29 | 0.53 | 0.38 | 0.29 | 0.095 | 0.14 | 34 | " | 119 |
| 30 | 0.51 | 0.57 | 0.35 | 0.084 | 0.17 | 39 | " | 148 |
| Comparative Zr alloy | | | | | | | | |
| 1 | 0.14* | 0.20 | 0.10 | 0.040 | | 35 | " | 160 |
| 2 | 1.91* | 0.191 | 0.10 | 0.050 | | 32 | " | 172 |
| 3 | 1.21 | 0.15* | 0.098 | 0.053 | | 39 | " | 145 |
| 4 | 1.01 | 0.76* | 0.11 | 0.045 | | 37 | " | 163 |
| 5 | 1.05 | 0.193 | 0.051* | 0.081 | | 40 | " | 149 |
| 6 | 1.06 | 0.21 | 0.55* | 0.052 | | 31 | " | 198 |
| 7 | 1.46 | 0.21 | 0.10 | —* | —* | 33 | " | 199 |
| 8 | 0.98 | 0.22 | 0.10 | —* | —* | 38 | " | 151 |
| 9 | 1.02 | 0.21 | 0.12 | 0.055 | 0.63* | 40 | " | 179 |
| 10 | 1.01 | 0.194 | 0.11 | 0.060 | 0.11 | 73* | " | 234 |

*outside the scope of this invention

As the data in Table 1 show, Zr alloy Nos. 1 to 30 of the present invention exhibited superior corrosion resistance over comparative Zr alloy Nos. 1 to 10 in which one of the components was outside the compositional range specified by the present invention.

The zirconium alloy of the present invention exhibits improved corrosion resistance under the conditions to which nuclear reactor fuel claddings are exposed and, therefore it will offer many industrial advantages such as the one that fuel claddings made of this alloy can be put to commercial service over a very long period.

What is claimed is:

1. A corrosion resistant zirconium alloy for uses as a nuclear reactor fuel cladding material consisting essentially of on a weight % basis
   0.2–1.7% Sn,
   0.19–0.6% Fe,
   0.07–0.4% Cr,
   0.01–0.2% Ta,
   the balance being Zr and incidental impurities, provided that the content of nitrogen in the form of incidental impurities is no more than 60 ppm.

2. The zirconium alloy of claim 1, further comprising from 0.05 to less than 0.5% Nb.

3. The zirconium alloy of claim 2, wherein the Fe content is 0.19–0.24% and the Cr content is 0.07–0.13%.

4. The zirconium alloy of claim 2, wherein the Sn content if 0.2–1.15%.

5. The zirconium alloy of claim 3, wherein the Sn content is 0.2–1.15%.

6. The zirconium alloy of claim 1, wherein the Sn content is 0.2–1.15%.

7. The zirconium alloy of claim 1, wherein the Fe content is 0.19–0.24% and the Cr content is 0.07–0.13%.

* * * * *

UNITED STATES PATENT AND TRADEMARK OFFICE
CERTIFICATE OF CORRECTION

PATENT NO. : 5,196,163

DATED : March 23, 1993

INVENTOR(S) : Yutaka MATSUO et al

It is certified that error appears in the above-identified patent and that said Letters Patent is hereby corrected as shown below:

Title page, Section [56] References Cited, under "Foreign Patent Documents", and below "1408152    3/1963    France" insert the following --60-36640      2/1985      Japan <u>Other Documents</u>
G.P. Sabol and S.G. McDonald, "The Effect of Niobium Additions on the Corrosion Behavior of Zircology -4" Nuclear Science and Engineering 63 83-90 (1977)--.

Title page, Section [57] ABSTRACT, line 3, delete "0.02" and insert --0.2--.

Signed and Sealed this

Thirteenth Day of September, 1994

*Attest:*

BRUCE LEHMAN

*Attesting Officer*        *Commissioner of Patents and Trademarks*